(12) United States Patent
Glover (10) Patent No.: US 12,160,277 B2
(45) Date of Patent: Dec. 3, 2024

(54) TEST SYSTEM AND TEST METHOD

(71) Applicant: Rohde & Schwarz GmbH & Co. KG, Munich (DE)

(72) Inventor: Brian Glover, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 117 days.

(21) Appl. No.: 17/575,411

(22) Filed: Jan. 13, 2022

(65) Prior Publication Data

US 2023/0224050 A1    Jul. 13, 2023

(51) Int. Cl.
*H04B 17/00*  (2015.01)
*H04B 17/15*  (2015.01)
*H04L 43/0823*  (2022.01)

(52) U.S. Cl.
CPC ......... *H04B 17/0085* (2013.01); *H04B 17/15* (2015.01); *H04L 43/0823* (2013.01)

(58) Field of Classification Search
CPC .. H04B 17/0085; H04B 17/15; H04L 43/0823
USPC ......................................................... 370/241
See application file for complete search history.

(56) References Cited

U.S. PATENT DOCUMENTS

| | | | |
|---|---|---|---|
| 8,693,351 B2 | 4/2014 | Olgaard | |
| 8,966,454 B1 * | 2/2015 | Michelsen | H04L 1/00 709/224 |
| 9,883,412 B2 | 1/2018 | Chandra et al. | |
| 10,296,433 B2 | 5/2019 | Olgaard et al. | |
| 10,397,765 B2 | 8/2019 | Rowell et al. | |
| 10,637,589 B1 * | 4/2020 | Chakraborty | H04B 17/318 |
| 10,999,723 B2 | 5/2021 | Barthel | |
| 2013/0028100 A1 | 1/2013 | Olgaard | |
| 2020/0076514 A1 * | 3/2020 | Glover | H04B 17/29 |
| 2020/0112487 A1 * | 4/2020 | Inamdar | H04L 43/08 |
| 2020/0313999 A1 * | 10/2020 | Lee | H04L 43/0847 |

* cited by examiner

*Primary Examiner* — Christopher M Crutchfield
*Assistant Examiner* — Jean F Voltaire
(74) *Attorney, Agent, or Firm* — CHRISTENSEN O'CONNOR JOHNSON KINDNESS PLLC (57) ABSTRACT

A test system for testing a device under test is described. The test system includes a testing circuit and the device under test. The testing circuit is configured to establish a wireless connection with the device under test based on a wireless communication standard having a low energy protocol. The wireless connection includes a plurality of channels, wherein the plurality of channels is configured to transmit data packages between the testing circuit and the device under test. The testing circuit and the device under test are configured to communicate with each other via the plurality of channels by a channel hopping technique. A radio frequency (RF) level of a signal transmitted by the testing circuit in at least one test channel to be tested, which belongs to the plurality of channels, is lower than an RF level of a signal transmitted by the testing circuit in at least one other channel of the plurality of channels. Further, a test method of testing a device under test is described.

20 Claims, 4 Drawing Sheets

TEST SYSTEM AND TEST METHOD

FIELD OF THE DISCLOSURE

Embodiments of the present disclosure generally relate to test systems for testing a device under test. Embodiments of the present disclosure further relate to test methods of testing a device under test.

BACKGROUND

Many different kinds of electronic devices employ low energy wireless connections in order to communicate with other electronic devices within a nearfield distance.

Usually, the low energy communication properties of such electronic devices are tested with regard to their radio frequency performance while using a physical connection to control the respective electronic device.

However, establishing the physical connection to control the electronic device is time consuming since cables have to be connected to the respective device. Further, the control cables used may restrict the testing quality as well as the testing area in case of short cables. In some embodiments, certain types of electronic devices do not even have a port for establishing a physical connection, and thus have to be tested over the air.

When testing at very low signal levels, a wireless connection between a test instrument and the electronic device under test may be lost, such that the respective test cannot be performed correctly.

Accordingly, there is a need for a test system and a testing method that provide the possibility to test low energy communication properties of electronic devices at low signal levels.

SUMMARY

Embodiments of the present disclosure provide test systems for testing a device under test. In an embodiment, a test system comprises a testing circuit and the device under test. The testing circuit is configured to establish a wireless connection with the device under test based on a wireless communication standard having a low energy protocol. The wireless connection comprises a plurality of channels, wherein the plurality of channels is configured to transmit data packages between the testing circuit and the device under test. The testing circuit and the device under test are configured to communicate with each other via the plurality of channels by a channel hopping technique. A radio frequency (RF) level of a signal transmitted by the testing circuit in at least one test channel to be tested, which belongs to the plurality of channels, is lower than an RF level of a signal transmitted by the testing circuit in at least one other channel of the plurality of channels.

The data packages are associated with information that is transmitted between the testing circuit and the device under test. Thus, when the testing circuit and the device under test communicate with each other, data packages are sent from the testing circuit to the device under test and vice versa via the plurality of channels.

Therein, different channels of the plurality of channels are used for the communication in a consecutive manner based on the channel hopping technique. Thus, only a predefined subset of the plurality of channels transmits data packages at any given time, while the remaining channels may be idle. For example, only a single channel may be active at a time, i.e. only a single channel may be used for transmitting data packages at a time.

In some embodiments, the plurality of channels correspond to communication channels that are used by the device under test for communicating with other electronic devices.

The test system according to embodiments of the present disclosure is based on the finding that a low energy wireless connection between the testing circuit and the device under test is maintained even for low RF levels of the at least one test channel to be tested if the RF level of the other channels of the plurality of channels is kept higher than the RF level of the at least one test channel.

In some embodiments, if the RF level of the at least one test channel to be tested is too low for correctly transmitting data packages, the connection between the testing circuit and the device under test is not lost, as the testing circuit and the device under test are configured to communicate with each other via the plurality of channels by the channel hopping technique. Even if the RF level of the at least one test channel to be tested is too low, the RF level of the other channels not being tested is high enough for maintaining the connection between the testing circuit and the device under test.

Thus, the device under test can be tested via the at least one test channel at low signal levels without losing the connection between the device under test and the testing circuit. Accordingly, properties of the device under test can be tested at low signal levels in a reliable manner, and without a need for a physical connection between the testing circuit and the device under test.

For example, a sensitivity level of the device under test can be determined without the need for a physical connection between the device under test and the testing circuit. The sensitivity level is associated with a minimal signal level needed for a reliable data transmission between the device under test and another electronic device.

According to an aspect of the present disclosure, the RF level of the at least one test channel to be tested is lower in some embodiments than the respective RF level of each other channel of the plurality of channels. In other words, the RF level of each channel that is currently not being tested is higher than the RF level of the at least one test channel to be tested, for example high enough in order to ensure that the connection between the testing circuit and the device under test is maintained irrespective of the RF level of the at least one test channel to be tested.

According to another aspect of the present disclosure, the wireless communication standard is associated with, for example, Bluetooth Low Energy. Accordingly, the channels may be established as data channels of the Bluetooth Low Energy protocol. Bluetooth Low Energy is also known as "Bluetooth Smart".

It is noted that in the context of Bluetooth Low Energy, the terms "equipment under test" and "instrument under test" are also common do denote the device under test. In the present disclosure, the terms "device under test", "equipment under test" and "instrument under test" are used as synonyms.

In an embodiment of the present disclosure, the testing circuit is configured to selectively adjust the RF level of the at least one test channel to be tested. In some embodiments, the testing circuit is configured to selectively adjust the RF level of the at least one test channel to be tested and the RF level of at least one other channel of the plurality of channels.

In other words, the testing circuit may vary the signal level of the data packages sent via the at least one test channel to be tested and/or the signal level of the data packages transmitted via the other channels.

A further aspect of the present disclosure provides that the testing circuit is configured, for example, to keep an RF level difference between the at least one test channel to be tested and the at least one other channel of the plurality of channels constant. In other words, the testing circuit may vary the RF levels of the at least one test channel to be tested and of the other channels simultaneously in such a way that the RF level difference is kept constant. Thus, a constant RF level difference between the at least one test channel to be tested and the other channels is maintained.

In a further embodiment of the present disclosure, the testing circuit is configured to adjust an RF level difference between the at least one test channel to be tested and the at least one other channel of the plurality of channels. In other words, the testing circuit may vary the RF levels of the at least one test channel to be tested and of the other channels individually, i.e. independent from one another.

For example, the testing circuit may be configured to keep the RF levels of the other channels constant, and to adjust the RF level of the at least one test channel to be tested only. In some embodiments, the testing circuit may be configured to lower the RF level of the at least one test channel to be tested, while maintaining the RF levels of the other channels.

The testing circuit may be configured to adjust the RF level of the at least one test channel to be tested based on an RF level of a signal received from the device under test via the at least one test channel to be tested. In some embodiments, the testing circuit is configured to reduce the RF level of the at least one test channel to be tested compared to the RF level of the signal received from the device under test via the at least one test channel to be tested.

In other words, the testing circuit may reduce the RF level of signals sent by the testing circuit via the at least one test channel based on the RF level of the signal received from the device under test via the at least one test channel to be tested.

In general, the RF level may be reduced by a fixed amount, for example about 3 db. However, the RF level may be reduced by any other amount, for example by varying amounts.

According to an aspect of the present disclosure, the testing circuit is configured, for example, to increase a probability of hopping into the at least one test channel to be tested. Thus, if the testing circuit and the device under test are currently using one of the other channels for communication, the at least one test channel has an increased chance to be the next channel used for communication. Accordingly, the at least one test channel is active more often than the other channels, such that the at least one test channel can be tested more frequently. Thus, the time necessary for testing the at least one test channel is reduced.

In an embodiment of the present disclosure, the testing circuit is configured to conduct a packet error rate (PER) test on the device under test via the wireless connection. In general, the PER corresponds to the number of data packages that are not successfully received by the device under test divided by the total number of data packages sent to the device under test. Thus, the PER constitutes a measure for the reliability of the wireless connection between the testing circuit and the device under test at a particular RF level.

In some embodiments, the testing circuit is configured to conduct the PER test via the at least one test channel. In other words, the reliability of the transmission of data packages via the at least one test channel is tested by the testing circuit for at least one particular RF level of the at least one test channel, for example for several RF levels of the at least one test channel.

Another aspect of the present disclosure provides that the testing circuit is configured, for example, to conduct the PER test for a receiver mode of the device under test. Accordingly, the testing circuit may be configured to generate an output signal comprising the data packages and transmit the output signal to the device under test via the at least one test channel. The device under test may receive the data packages and count the correctly received data packages. The device under test may feed back the number of successfully received data packages to the testing circuit via the at least one test channel, via one of the other channels, and/or via the control channel.

Of course, the device under test may also count the incorrectly received data packages. However, counting the number of correctly received data packages and the number of incorrectly received data packages is equivalent, as these numbers add up to the total number of sent data packages.

In some embodiments, the PER test comprises an error threshold being associated with a maximal allowable PER of the device under test. The maximal allowable PER constitutes a decision criterion for whether the PER test is passed by the device under test or not. More precisely, the PER test is passed if the PER is smaller than the maximal allowable PER. Conversely, the PER test is failed if the PER is bigger than the maximum allowable PER. Stated differently, the device under test has to fulfill a certain PER requirement in order to pass the PER test.

In a further embodiment of the present disclosure, the testing circuit is configured to conduct the PER test at several different RF levels of the at least one test channel to be tested. Thus, a PER may be conducted by the testing circuit at a first RF level of the test channel After the PER test is completed, the RF level of at least the test channel may be adapted to a second RF level, for example wherein the second RF level is lower than the first RF level. Then, a PER test may be conducted by the testing circuit at the second RF level of the test channel.

Of course, further PER tests may be conducted at further RF levels being different from both the first RF level and the second RF level. For example, the RF level of the at least one test channel may be lowered until the device under test fails the PER test, thereby obtaining the sensitivity level of the device under test. More precisely, the sensitivity level of the device under test may be determined to be equal to the lowest RF level of the at least one test channel for which the device under test has passed the PER test.

The RF levels of the other channels may also be adapted between the individual PER tests. In some embodiments, the RF levels of the other channels may be lowered between the individual PER tests. Alternatively, the RF levels of the other channels may be kept constant between the individual PER tests.

According to another aspect of the present disclosure, the testing circuit is configured, for example. to conduct the PER test on several different test channels to be tested simultaneously or consecutively. Accordingly, the reliability of the transmission of the data packets transmission on several of the test channels is tested simultaneously or consecutively. For example, a sensitivity level of several of the test channels, for example of all test channels, may be determined.

A further aspect of the present disclosure provides that the wireless connection comprises, for example, a control channel, wherein the control channel is configured, for example, to transmit at least one control message between the testing circuit and the device under test, and wherein an RF level of the control channel is higher than an RF level of the at least one test channel to be tested. The control channel may be used for establishing the communication between the testing circuit and the device under test and/or for controlling the device under test.

The at least one control message may comprise information being relevant for establishing a communication between the testing circuit and the device under test and/or for controlling the device under test to enter a certain operational mode.

In general, the at least one test channel to be tested and the other channels are different from the control channel. Thus, the at least one test channel to be tested and the other channels are used for transmitting data other than the at least one control message between the testing circuit and the device under test.

It has been found that a low energy wireless connection between the testing circuit and the device under test is maintained even for low RF levels of the at least one test channel if the RF level of the control channel is kept higher than the RF level of the at least one test channel.

Thus, the device under test can be tested via the at least one test channel at low signal levels without losing the connection between the device under test and the testing circuit. Accordingly, properties of the device under test can be tested at low signal levels in a reliable manner, and without a need for a physical connection between the testing circuit and the device under test.

In some embodiments, the testing circuit is configured to selectively adjust the RF level of the control channel and the RF level of the at least one test channel to be tested. In other words, the testing circuit may vary the signal level of the at least one control message sent via the control channel and/or the signal level of the data packages transmitted via the at least one test channel.

The testing circuit may be configured to keep an RF level difference between the control channel and the at least one test channel to be tested constant. In other words, the testing circuit may vary the RF levels of the control channel and of the at least one test channel simultaneously in such a way that the RF level difference is kept constant. Thus, a constant RF level difference between the control channel and the at least one test channel is maintained.

In an embodiment of the present disclosure, the testing circuit is configured to adjust an RF level difference between the control channel and the at least one test channel to be tested. In other words, the testing circuit may vary the RF levels of the control channel and of the at least one test channel individually, i.e. independent from one another.

For example, the testing circuit may be configured to keep the RF level of the control channel constant, and to adjust the RF level of the at least one test channel only. In some embodiments, the testing circuit may be configured to lower the RF level of the at least one test channel, while maintaining the RF level of the control channel.

Embodiments of the present disclosure further provide test methods of testing a device under test. In an embodiment, a test method comprises the following steps:
establishing a wireless connection with the device under test based on a wireless communication standard having a low energy protocol by a testing circuit, wherein the wireless connection comprises a plurality of channels; and
transmitting data packages via the plurality of channels by a channel hopping technique.

Therein, an RF level of a signal transmitted by the testing circuit in at least one test channel to be tested, which belongs to the plurality of channels, is lower than an RF level of a signal transmitted by the testing circuit in at least one other channel of the plurality of channels.

In some embodiments, various test systems described above are configured to conduct the test methods described herein.

Regarding the further advantages and properties of the test methods, reference is made to the explanations given above with respect to the test systems, which also hold for the test methods and vice versa.

According to an aspect of the present disclosure, the RF level of the at least one test channel to be tested is, for example, selectively adjusted. In some embodiments, the RF level of the at least one test channel to be tested and the RF level of at least one other channel of the plurality of channels are selectively adjusted.

In other words, the signal level of the data packages sent via the at least one test channel to be tested and/or the signal level of the data packages transmitted via the other channels may be varied.

According to another aspect of the present disclosure, a packet error rate (PER) test is conducted, for example, on the device under test by the testing circuit via the wireless connection. In general, the PER corresponds to the number of data packages that are not successfully received by the device under test divided by the total number of data packages sent to the device under test. Thus, the PER constitutes a measure for the reliability of the wireless connection between the testing circuit and the device under test.

In particular, the PER test is conducted via the at least one test channel to be tested. In other words, the reliability of the transmission of data packages via the at least one test channel is tested for at least one particular RF level of the at least one test channel.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
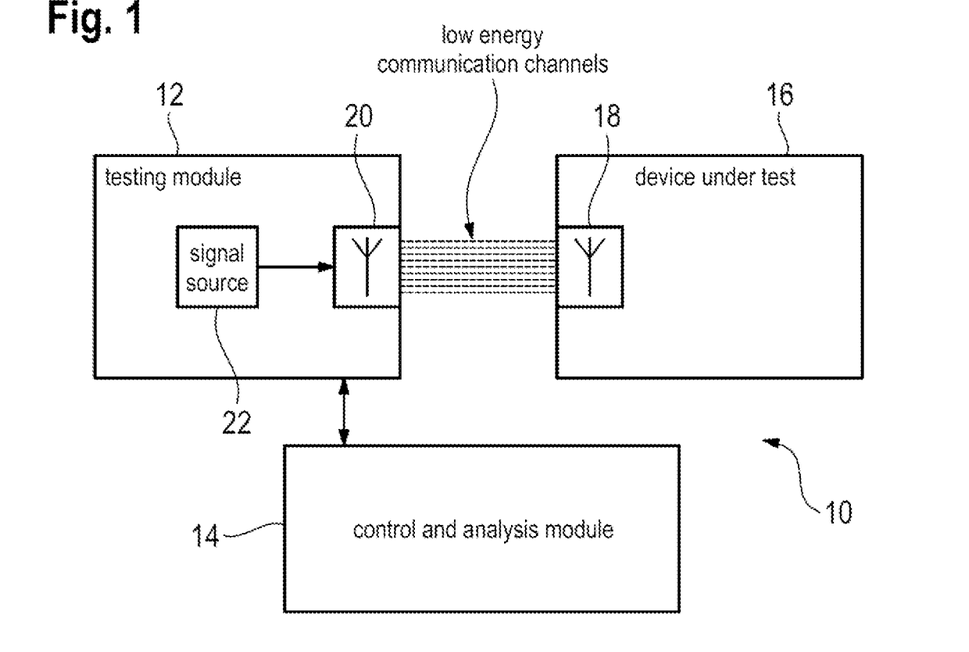
FIG. 1 schematically shows a test system according to a first embodiment of the present disclosure.

FIG. 1 shows a block diagram of a representative test system 10 comprising a testing circuit 12, a control and analysis circuit 14, and a device under test 16. In general, the device under test 16 is established as an electronic device being configured to communicate with other electronic devices via a low energy wireless communication protocol.

In some embodiments, the device under test 16 is configured to communicate with other electronic devices via a low energy wireless communication protocol based on a channel hopping technique, i.e. by using different channels over time. In some embodiments, the device under test 16 is configured to communicate with other electronic devices via Bluetooth Low Energy, which is also called Bluetooth Smart.

Accordingly, the device under test 16 comprises an RF circuit 18 being configured to receive and transmit electromagnetic waves at least in a predetermined frequency band, for example in a frequency band defined by the Bluetooth Low Energy protocol.

The testing circuit 12 is established as a testing device or is integrated into a testing device for testing low energy communication properties of the device under test 16. In some embodiments, the testing circuit 12 is established as a testing device or is integrated into a testing device for testing Bluetooth Low Energy communication properties of the device under test 16.

The testing circuit 12 comprises an RF circuit 20 being configured to receive and transmit electromagnetic waves at least in the same predetermined frequency band as the device under test 16. The testing circuit 12 further comprises a signal source 22 being configured to generate an RF output signal.

The signal source 22 is connected to the RF circuit 20 in a signal transmitting manner, such that the RF output signal generated by the signal source 22 can be transmitted to the device under test 16 via the RF circuit 20. Therein and in the following, the term "connected in a signal transmitting manner" is understood to denote a cable-based or wireless connection that is configured to transmit signals between the respective devices or components.

In general, the control and analysis circuit 14 is configured to control the testing circuit 12 or the signal source 22 to generate an RF output signal with predetermined properties. The control and analysis circuit 14 is further configured to receive and analyze measurement data from the testing circuit 12 that is associated with a performance of the device under test 16. For example, the control and analysis circuit 14 may be established as a computer, as a laptop, or as any other type of smart device having suitable software executed thereon.

Figure 2:
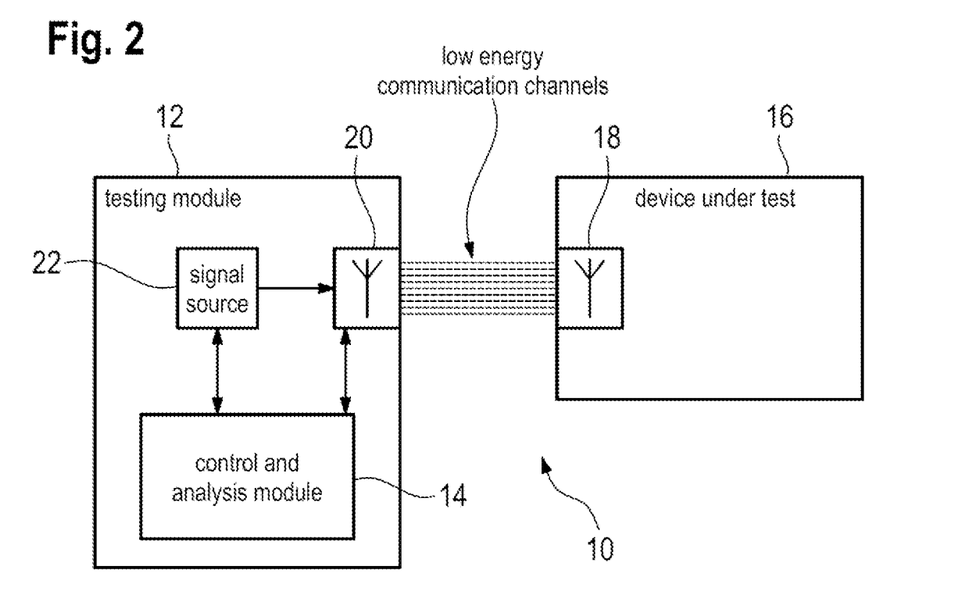
FIG. 2 schematically shows a test system according to a second embodiment of the present disclosure.

It is noted that while the control and analysis circuit 14 is established separately from the testing circuit 12 in the embodiment of the test system 10 shown in FIG. 1, the control and analysis circuit 14 may also be integrated into the testing circuit 12, as is shown in FIG. 2.

Generally speaking, the testing circuit 12 and the control and analysis circuit 14 are configured to test the device under test 16 via the low energy communication protocol employed by the device under test 16, for example via Bluetooth Low Energy. The test system 10 is configured to perform a test method of testing the device under test 16, an example of which is described in the following with reference to FIG. 3.

Figure 3:
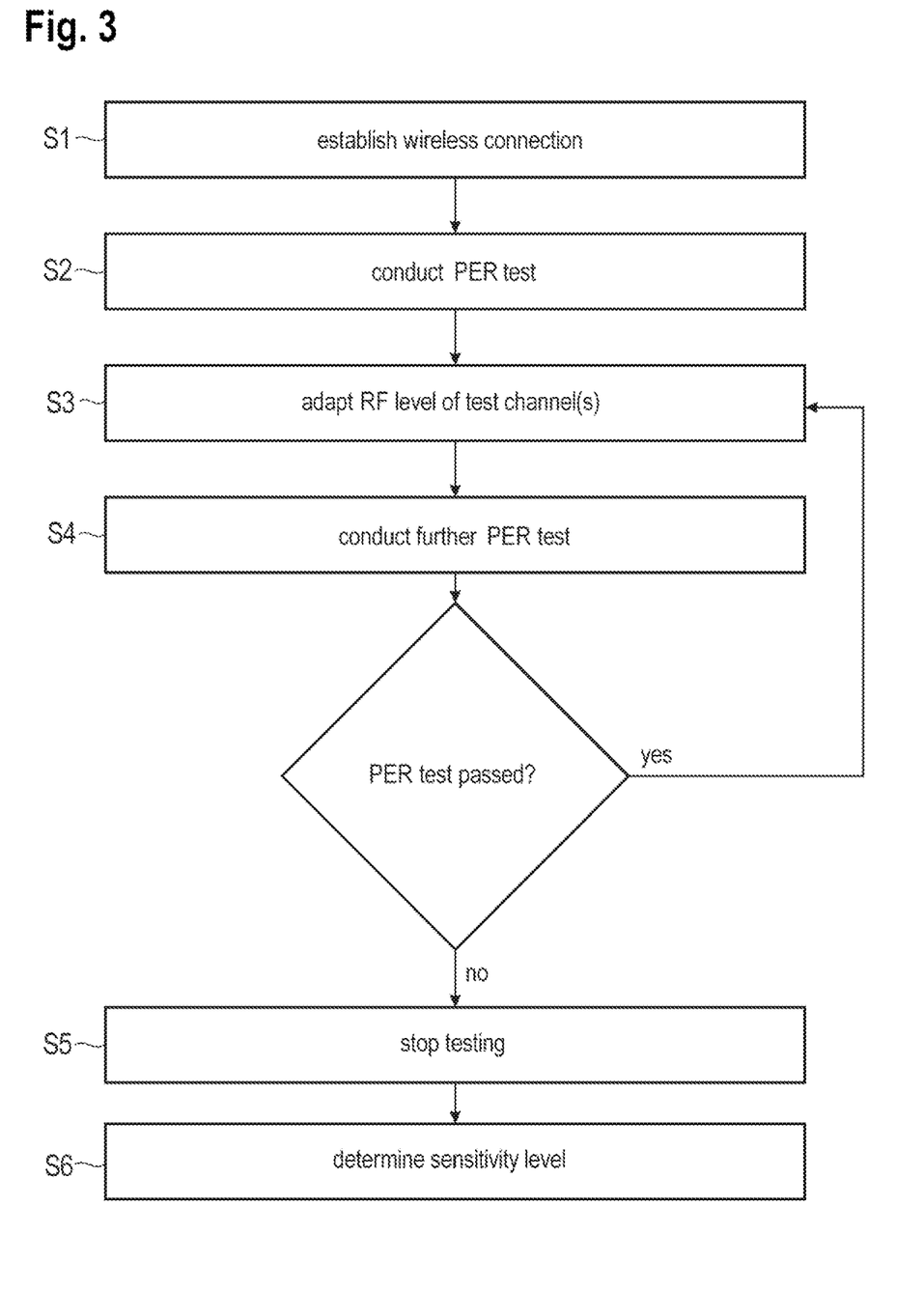
FIG. 3 shows an example of a flow chart of a testing method according to an embodiment of the present disclosure.

A wireless connection being based on a low energy communication protocol is established between the testing circuit 12 and the device under test 16 (step S1).

The wireless connection comprises a plurality of channels that are collectively denoted as "low energy communication channels" in FIGS. 1 and 2. Optionally, the wireless connection further comprises a control channel. The control channel is associated with control messages that are used in order to establish the wireless connection between the testing circuit 12 and the device under test 16, and/or in order to command the device under test 16 to enter a certain operational mode. If the low energy communication protocol is Bluetooth Low Energy, the control channel may be established as at least one of the three advertising channels according to the Bluetooth Low Energy protocol.

The control and analysis circuit 14 may control the testing circuit 12 to generate a control message comprising instructions for the device under test 16 in order to establish the wireless connection. The control message is transmitted to the device under test 16 via the control channel. Moreover, the control message may comprise instructions for the device under test 16 to enter a certain operational mode, for example a receiver mode (also called RX mode).

Without restriction of generality, a receiver mode of the device under test 16 is described in the following.

The plurality of channels is associated with data packages that are transmitted between the testing circuit 12 and the device under test 16, or more precisely from the testing circuit 12 to the device under test 16. If the low energy communication protocol is Bluetooth Low Energy, then plurality of channels may be established as data channels according to the Bluetooth Low Energy protocol.

When the connection is established, the testing circuit 12 and the device under test 16 communicate with each other by a channel hopping technique, i.e. different channels of the plurality of channels are used for transmitting data packages in a consecutive manner.

A packet error rate (PER) test is conducted via at least one test channel to be tested by the testing circuit, wherein the at least one test channel belongs to the plurality of channels (step S2).

Figure 4:
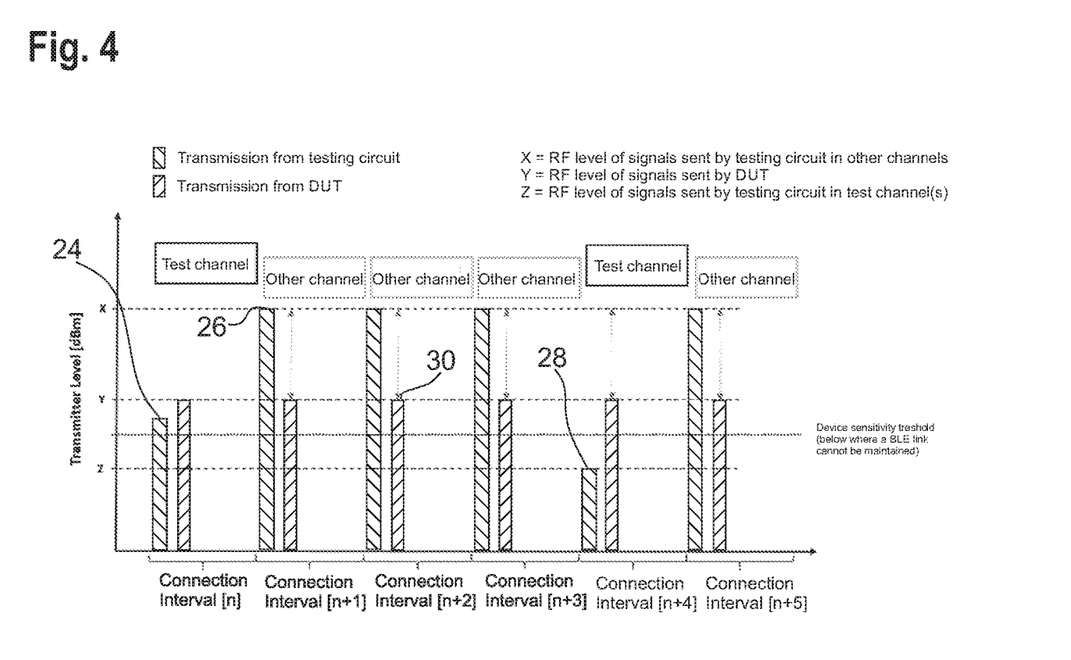
FIG. 4 shows a schematic diagram of an RF level of several RF channels plotted against time.

As is illustrated in FIG. 4, the PER test is conducted at a first RF level 24 of the at least one test channel, which is lower than an RF level 26 of the other channels of the plurality of channels.

Thus, the signal level of data packages transmitted via the at least one test channel is lower than the signal level of data packages sent by the testing circuit 12 via the other channels.

Figure 5:
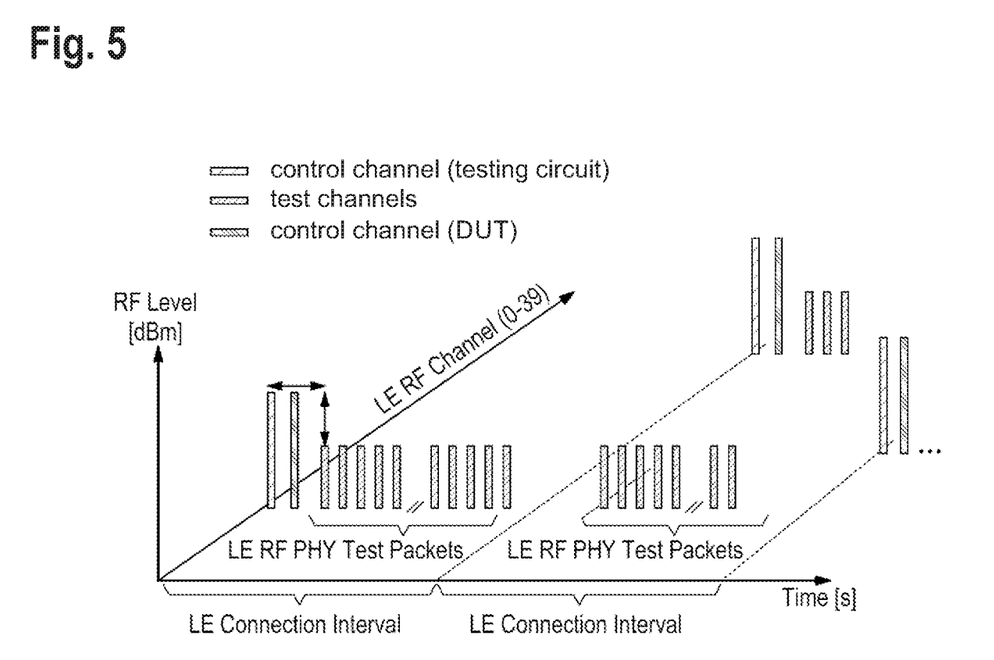
FIG. 5 shows a further schematic diagram of an RF level of several RF channels plotted against time.

Optionally, as is illustrated in FIG. 5, the signal level of the data packages ("LE RF PHY Test Packets" in FIG. 5) transmitted via the test channel may be lower than the signal level of a control message sent by the testing circuit 12, and also lower than the signal level of a control message sent by the device under test 16.

In general, the PER corresponds to the number of data packages that are not successfully received by the device under test 16 divided by the total number of data packages sent to the device under test. Thus, the PER constitutes a measure for the reliability of the wireless connection between the testing circuit 12 and the device under test 16 at the current RF level of the at least one test channel.

The PER test may be performed as described in the following:

The testing circuit 12 or the signal source 22 generates an RF output signal comprising the data packages and transmits the RF output signal to the device under test 16 via the at least one test channel to be tested. The device under test 16 receives the data packages and counts the correctly received data packages. The device under test 16 test feeds back the number of successfully received data packages to the testing circuit 12 via the at least one test channel, at least one of the other channels, and/or the control channel.

The control and analysis circuit 14 determines the PER of the device under test 16 at the first RF level of the at least one test channel. The control and analysis circuit 14 compares the determined PER with an error threshold for the device under test 16 in order to determine whether the device under test 16 has passed the PER test at the first RF level of the at least one test channel to be tested.

The error threshold is associated with a maximal allowable PER for the device under test 16. The maximal allowable PER may be dependent on a payload length of the data packages, i.e. on a number of symbols comprised in each data package, for example dependent on a number of bits comprised in each data package. For example, the maximal allowable PER may be between 10% and 35%, for example between 20% and 30%.

The PER test described above may be performed for all test channels to be tested simultaneously and/or consecutively.

In some embodiments, the testing circuit 12 may manipulate the probability of hopping into the at least one test channel to be tested. For example, the testing circuit 12 may increase the probability of hopping into the at least one test channel to be tested such that the time necessary for performing the PER test is reduced.

If the device under test 16 has passed the PER test at the first RF level 24 of the at least one test channel, the RF level is adapted to a second RF level 28 (step S3).

For example, the second RF level 28 of the at least one test channel is lower than the first RF level 24 of the at least one test channel if the device under test 16 has passed the previous PER test.

If the device under test 16 has failed the previous PER test, the second RF level 28 may be higher than the first RF level 24.

Without restriction of generality, the case is described in the following, in which the device under test 16 has passed the previous PER test.

Therein, the RF levels of the other channels may be adapted together with the RF level of the at least one test channel, such that a difference between the RF levels of the other channels and the at least one test channel is kept constant.

Alternatively, the RF levels of the other channels and of the at least one test channel may be adapted independent from each other, such that the RF level difference between the other channels and the at least one test channel changes.

In some embodiments, the RF level of the at least one test channel may be lowered, while the RF levels of the other channels are kept constant. Optionally, the testing circuit 12 may adjust the RF level of the at least one test channel to be tested based on an RF level 30 of a signal received from the device under test 16 via the at least one test channel to be tested.

In some embodiments, the testing circuit 12 reduces the RF level of the at least one test channel to be tested compared to the RF level of the signal received from the device under test 16 via the at least one test channel to be tested. Optionally, the RF level of the control channel may be adapted together with the RF level of the at least one test channel, such that a difference between the RF levels of the control channel and the at least one test channel is kept constant.

Alternatively, the RF levels of the control channel and of the at least one test channel may be adapted independent from each other, such that the RF level difference between the control channel and the at least one test channel changes. For example, the RF level of the at least one test channel may be lowered, while the RF level of the control channel is kept constant.

The PER test described above is repeated at the second RF level 28 of the at least one test channel (step S4).

If the device under test 16 passes the PER test at the second RF level 28 of the at least one test channel, steps S3 and S4 described above may be repeated at a third RF level of the at least one test channel. In some embodiments, the PER test is repeated until the device under test 16 fails the PER test at a certain RF level of the at least one test channel.

If the device under test fails a PER test, the testing of the device under test 16 is stopped (step S5).

The sensitivity level of the device under test 16 may be determined based on the PER tests described above (step S6).

The sensitivity level is associated with a minimal signal level needed for a reliable data transmission between the device under test 16 and another electronic device. Accordingly, the sensitivity level may be determined to be the lowest RF level for which the device under test 16 has passed the PER test.

With the test method described in the examples above, properties of the device under test 16 like the PER can be tested at low signal levels in a reliable manner, and without a need for a physical connection between the testing circuit 12 and the device under test 16.

In some embodiments, the test method described above allows for determining the sensitivity level of the device under test 16 over the air without losing the wireless connection between the testing circuit 12 and the device under test 16.

Certain embodiments disclosed herein, for example the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A test system for testing a device under test, the test system comprising: a testing circuit and the device under test,
the testing circuit being configured to establish a wireless connection with the device under test based on a wireless communication standard having a low energy protocol,
the wireless connection with the device under test comprising a plurality of channels, the plurality of channels being configured to transmit data packages between the testing circuit and the device under test,
the testing circuit and the device under test being configured to communicate with each other via the plurality of channels by a channel hopping technique, wherein the testing circuit and the device under test are configured to consecutively use different channels of the plurality of channels for communication based on the channel hopping technique, and
wherein a radio frequency (RF) level of a signal transmitted by the testing circuit to the device under test in at least one test channel to be tested, which belongs to the plurality of channels, is lower than an RF level of a signal transmitted by the testing circuit to the device under test in at least one other channel of the plurality of channels, the at least one other channel of the plurality of channels being different from the at least one channel to be tested.

2. The test system of claim 1, wherein the RF level of the at least one test channel to be tested is lower than the respective RF level of each other channel of the plurality of channels.

3. The test system of claim 1, wherein the wireless communication standard is associated with Bluetooth Low Energy.

4. The test system of claim 1, wherein the testing circuit is configured to selectively adjust the RF level of the at least one test channel to be tested.

5. The test system of claim 4, wherein the testing circuit is configured to keep an RF level difference between the at least one test channel to be tested and the at least one other channel of the plurality of channels constant.

6. The test system of claim 4, wherein the testing circuit is configured to adjust an RF level difference between the at least one test channel to be tested and the at least one other channel of the plurality of channels.

7. The test system of claim 4, wherein the testing circuit is configured to adjust the RF level of the at least one test channel to be tested based on an RF level of a signal received from the device under test via the at least one test channel to be tested.

8. The test system of claim 1, wherein the testing circuit is configured to increase a probability of hopping into the at least one test channel to be tested.

9. The test system of claim 1, wherein the testing circuit is configured to conduct a packet error rate (PER) test on the device under test via the wireless connection.

10. The test system of claim 9, wherein the testing circuit is configured to conduct the PER test for a receiver mode of the device under test.

11. The test system of claim 9, wherein the PER test comprises an error threshold being associated with a maximal allowable PER of the device under test.

12. The test system of claim 9, wherein the testing circuit is configured to conduct the PER test at several different RF levels of the at least one test channel to be tested.

13. The test system of claim 9, wherein the testing circuit is configured to conduct the PER test on several different test channels to be tested simultaneously or consecutively.

14. The test system of claim 1, wherein the wireless connection comprises a control channel, wherein the control channel is configured to transmit at least one control message between the testing circuit and the device under test, and wherein an RF level of the control channel is higher than an RF level of the at least one test channel to be tested.

15. The test system of claim 14, wherein the testing circuit is configured to selectively adjust the RF level of the control channel and the RF level of the at least one test channel to be tested.

16. The test system of claim 15, wherein the testing circuit is configured to keep an RF level difference between the control channel and the at least one test channel to be tested constant.

17. The test system of claim 15, wherein the testing circuit is configured to adjust an RF level difference between the control channel and the at least one test channel to be tested.

18. A test method of testing a device under test, the test method comprising:
establishing a wireless connection with the device under test based on a wireless communication standard having a low energy protocol by a testing circuit, wherein the wireless connection with the device under test comprises a plurality of channels; and
transmitting data packages via the plurality of channels by a channel hopping technique, wherein different channels of the plurality of channels are used consecutively for transmitting the data packages based on the channel hopping technique,
wherein an RF level of a signal transmitted by the testing circuit to the device under test in at least one test channel to be tested, which belongs to the plurality of channels, is lower than an RF level of a signal transmitted by the testing circuit to the device under test in at least one other channel of the plurality of channels, the at least one other channel of the plurality of channels being different from the at least one channel to be tested.

19. The test method of claim 18, wherein the RF level of the at least one test channel to be tested is selectively adjusted.

20. The test method of claim 18, wherein a packet error rate (PER) test is conducted on the device under test by the testing circuit via the wireless connection.

* * * * *